(12) United States Patent
Mende et al.

(10) Patent No.: US 7,481,132 B2
(45) Date of Patent: Jan. 27, 2009

(54) TORSIONAL VIBRATION DAMPER

(75) Inventors: Hartmut Mende, Bühl (DE); Johann Jäckel, Bühlertal (DE); Michael Bosse, Sinzheim (DE); Wolfgang Reik, Bühl (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 703 days.

(21) Appl. No.: 10/489,755

(22) PCT Filed: Sep. 10, 2002

(86) PCT No.: PCT/DE02/03350

§ 371 (c)(1),
(2), (4) Date: Nov. 22, 2004

(87) PCT Pub. No.: WO03/027534

PCT Pub. Date: Apr. 3, 2003

(65) Prior Publication Data

US 2005/0070362 A1    Mar. 31, 2005

(30) Foreign Application Priority Data

Sep. 17, 2001  (DE) ............... 101 45 776
Jun. 12, 2002  (DE) ............... 102 26 154

(51) Int. Cl.
*F16F 15/12*    (2006.01)

(52) U.S. Cl. ................... 74/574.3
(58) Field of Classification Search ........ 74/572.2, 74/573.12, 574.3, 574.4; 464/68.4, 68.92; 192/212

See application file for complete search history.

(56) References Cited

U.S. PATENT DOCUMENTS

| | | | | |
|---|---|---|---|---|
| 4,304,107 | A * | 12/1981 | Fall et al. ............ | 464/64.1 |
| 4,530,673 | A * | 7/1985 | Lamarche ............ | 464/64.1 |
| 5,310,267 | A | 5/1994 | Jäckel et al. .......... | 384/462 |
| 5,441,452 | A | 8/1995 | Jäckel et al. .......... | 464/61 |
| 6,371,857 | B1 * | 4/2002 | Kono et al. .......... | 464/68.92 |
| 6,712,706 | B2 | 3/2004 | Jäckel et al. .......... | 464/68 |

FOREIGN PATENT DOCUMENTS

| | | |
|---|---|---|
| DE | 42 14 655 A1 | 12/1992 |
| DE | 199 58 813 A1 | 12/2000 |

\* cited by examiner

*Primary Examiner*—Vicky A Johnson
(74) *Attorney, Agent, or Firm*—Alfred J. Mangels

(57) ABSTRACT

A torsional vibration damper with at least two parts that are rotatable about an axis and can turn relative to each other against the opposition of at least one coil spring. Support shoes are provided between the spring and an outer wall of the damper structure and are arranged to slide along the outer wall with the spring as it undergoes compression and relaxation. The support shoes include roller bodies to reduce sliding friction between the support shoes and the outer wall.

21 Claims, 5 Drawing Sheets

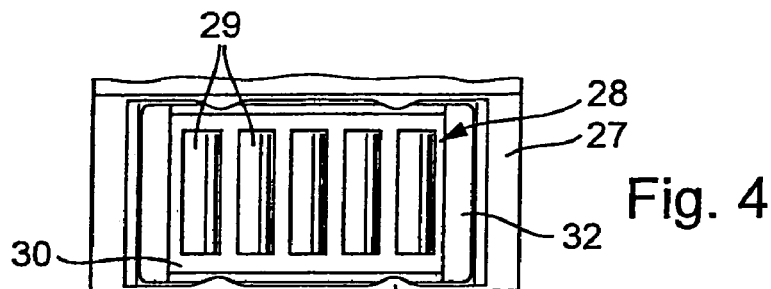
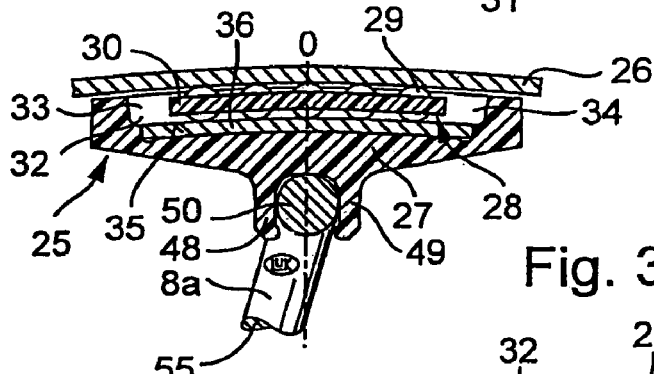
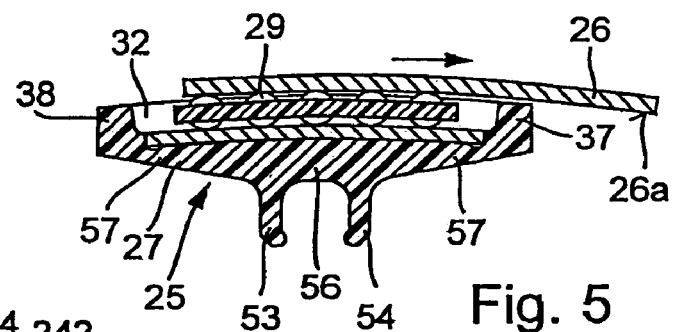
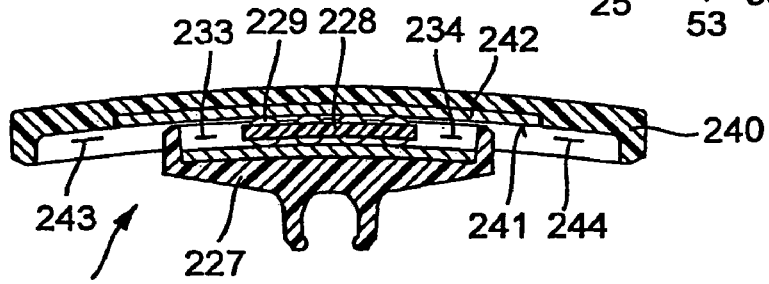
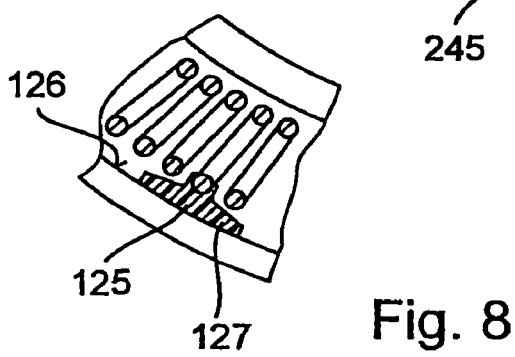
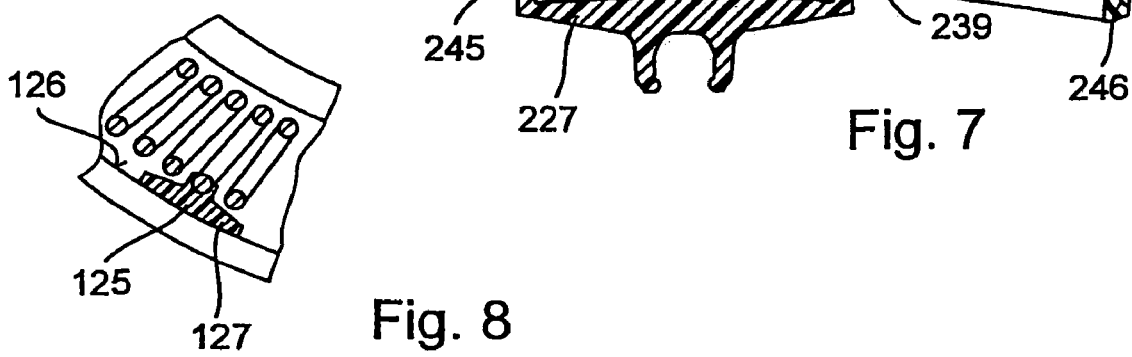

TORSIONAL VIBRATION DAMPER

BACKGROUND OF THE INVENTION

1. Field of the Invention

The invention relates to a torsional vibration damper, especially for motor vehicles, with at least two parts that are rotatable about an axis of rotation and are rotationally movable relative to each other against the reaction of at least one energy storage device, such as for example a coil spring, extending in a circumferential direction of the torsional vibration damper, and the two parts have regions by means of which the energy storage device can be compressed, at least one of the relatively rotatable parts has a wall region that axially overlaps at least radially outer regions of the energy storage device and extends longitudinally of the energy storage device.

2. Description of the Related Art

Such torsional vibration dampers in the form of so-called twin-mass flywheels are known, for example, from DE-OS 4 117 582, DE-OS 4 214 655, DE-OS 4 414 584, DE-OS 4 420 927 and DE-OS 19522718.

An object of the present invention is to optimize the damping characteristics of the above-mentioned type of torsional vibration dampers. By the inventive arrangement features of a torsional vibration damper, it should also be ensured that it can be produced and installed in a particularly simple manner. It should be especially also be ensured that also at higher rotational speeds of the torsional vibration damper, its energy storage device, especially in the form of coil springs, can optimally perform its intended functions.

SUMMARY OF THE INVENTION

In accordance with the invention, that is achieved with a torsional vibration damper of the type described at the outset, in that the at least one energy storage device is supported radially outwardly by at least one support element that is arranged between the energy storage device and the portion of the wall region that overlaps the energy storage device and by in compression of the energy storage device is movable along the wall, whereby the support element has at least one support shoe that engages at least one portion of the energy storage device, between which and the wall region at least one roller body is provided that is rollable along a surface carried by the support shoe. The at least one roller body can therefore roll on a roller surface carried by the support shoe, so that then the support element or the associated support shoe cannot generate any sliding friction that could oppose an extension and relaxation of the energy storage device. During such rolling movement, the roller body is also supported by a rolling surface that is carried by that wall region that axially overlaps the energy storage device. Thereby it is ensured that the at least one roller body can carry out a rolling movement at least relative to sections of the disclosed wall region. The at least one roller body can roll directly along sections that are non-rotatable with respect to the wall. However, it can be especially advisable to provide an intermediate element between the at least one roller body and the wall region, that on one hand is movable along the wall region and on the other hand forms a rolling surface for that at lest one roller element. By one such arrangement the supporting element is therefore formed by the at least one roller body, the support shoe that is arranged radially inside the roller element, and the intermediate part that is arranged radially outside of the roller element.

In a particularly advantageous way the intermediate element, the at least one roller body and the support shoe are combined as one structural unit that is mountable as such. Insofar as no intermediate element is necessary for forming the support element, the at least one roller body or the bearing and the associated support shoe can be combined into a single structural unit. In order to form one such structural unit, corresponding connections are provided between the so-formed structural elements that on the one hand ensure solidarity and on the other hand ensure the necessary movability between the individual structural elements. For example, snap-on connections can be utilized, whereby, for example, to that end one structural element can have projections, such as, for example, noses, that engage with movement play in correspondingly dimensioned guide grooves of another structural element.

By the existence of an intermediate element, it can be advantageous if the intermediate element is movable within limits relative to the support shoe and by a movement between those two structural elements the at least one roller body rolls on a surface of the support shoe as well as on a surface of the intermediate element. Through the limited movability it is at least ensured that between the two rotatable parts of the torsional vibration damper, against the operation of the at least one energy storage device at least one certain rotation angle in the clockwise direction, and/or opposite to the clockwise direction is made possible in which no friction is produced by the support element. By exceeding the stated limited angular movement the intermediate element can slide along a surface that is carried by a wall region that axially overlaps the at least one energy storage device. On the basis of the thus-provided friction contact, a friction damping effect that is connected parallel to the action of the energy storage device can be produced. In accordance with a further embodiment possibility of the present invention, at least one roller element can be arranged between the intermediate element and the noted wall region that overlies the at least one energy storage device.

In order to ensure acceptable tilt stability of the support elements, and therewith to achieve good guidance of the support elements, it can be especially advantageous to provide several roller bodies arranged one after the other, as seen in the circumferential direction of the torsional vibration damper. Those roller bodies can be formed, for example, by balls and/or rollers and/or needle rollers. The utilization of needle rollers is particularly advantageous because they save space in the radial direction, and on the basis of their lengthwise extent have a good load capacity because at least linear contact with the adjacent surfaces is provided. When utilizing several roller bodies they can advantageously be positioned relative to each other by a cage. A cage also has the additional advantage that it can be drawn upon to produce a loss-free connection between the roller bodies and the further components that form a support element.

For producing a support element, it can be especially advantageous if at least one of its formed components, for example the support shoe and/or the intermediate element, is made of plastic. Although the rolling path can be formed directly by the material of the support shoe and/or the intermediate element, it is especially suitable, particularly if plastics are utilized, to provide at least one of those parts with a metallic insert that forms a rolling pathway. Such a metallic insert can be connected with one of the components, namely the support shoe and/or the intermediate element, through a form-lick, such as, for example, a snap connection. Nevertheless, it can also be advantageous when such an insert is embedded in the material of the intermediate element and/or the support shoe during their production, which is an advantage when plastic is utilized, for then the corresponding components or elements can be produced by injection molding. It can be especially advantageous when the torsional vibration damper has at least two energy storage devices that extend over at least 90°, in the circumferential direction of the torsional vibration damper, and are radially supported at least at the ends of adjacent regions of the energy storage devices by a support element. By the use of very long energy storage devices, such as, foe example, coil springs, it can also be suitable to also provide support elements in regions of such an energy storage device that lie between its ends.

When utilizing energy storage devices with a large length/coil diameter ratio, they can be formed as a single piece, or else also by several shorter springs arranged one behind another.

When utilizing several shorter springs to form a long energy storage device it can be advantageous to provide a support element formed in accordance with the invention at least between two adjacent shorter springs.

It can be especially advantageous when coil springs are utilized that they are guided in a curved retainer that is formed from regions of at least one of two relatively rotatable parts, whereby that retainer through which the engaged coil spring wall regions are bounded and the at least one support shoe directly radially supports at least one winding of the coil spring. For that purpose, the corresponding support she can have at least one region that at least partially engages a radially outer section of a spring winding, through which the support shoe can be fixed in the longitudinal direction of the related coil spring. A connection can also be provided between the support shoe and the coil spring that serves as a holder for the support shoe relative to the coil spring in a direction perpendicular to the longitudinal axis of the coil spring.

Through one such arrangement of the torsional vibration damper, it is ensured that the at least one support shoe or the support element has or remains in a defined position relative to the coil spring, and in addition is securely held on the coil spring. Therethrough, the possibility is provided to join the coil spring and the shoe as a preassembled unit to provide for the installation of the damper. Thereby the corresponding coil springs and the thereon-provided support elements can already be properly assembled with each other during spring production.

In an advantageous way the holder of the support shoe or the support element on the coil spring can take place over the region of the support shoe which surrounds a winding of the coil spring, so that it has a force-locking or a form-locking connection with the wire or the corresponding winding. In an advantageous way, that connection can be formed as a snap connection, so that the shoes can be clipped onto the corresponding coil springs.

The arrangement of the holder or connection between a support shoe and a coil spring can be formed in a advantageous way so that the holder provided between the support shoe and at least one spring winding makes possible at least a small pivotal angular movement of the at least one winding relative to the support shoe. It will thereby be ensured that when the corresponding coil spring is compressed, the windings work or can be deformed without a need to be exerted on the support shoe, which would cause a rotation or a twisting of the support shoe.

The allowable pivotal movement or the possible twist angle suitably lies between 2 and 10 degrees. That twist angle can also be dimensioned to be greater or less, depending upon the pitch of the windings in the region of the support shoe. For an optimal functioning of the torsional vibration damper, or to ensure an acceptable guidance and holding of the support shoes in accordance with the invention, it can be especially advantageous when the at least one winding for supporting the at least one winding encompassing region of the at least one support shoe that the wire that forms that winding encompass it relative to its cross section as well as over its longitudinal extent.

Thereby a middle section of that region—viewed in the longitudinal direction of the spring—can have no play or only a small amount of play relative to the spring wire and that the section extending laterally of that middle section of that region at an increasing distance from the middle region has an increased play relative to that spring wire.

In an advantageous way, the support shoe can have at lease one extension that is formed umbrella-like and that extends in the longitudinal direction of the spring, namely starting from the positioning or holding of the corresponding support shoe to the spring ensured region. In an advantageous way, the support shoe can have a corresponding extension on both sides to ensure positioning of the same on the spring. It can thereby also be appropriate for the extensions—viewed in the longitudinal direction of the spring—to have a cross section that diminishes with increasing distance from the region of the support shoe encompassed by the spring winding. In an advantageous way that cross section can be formed wedge-like. By virtue of such an arrangement of the extensions it will be ensured that also by centrifugal force loading of the corresponding coil spring the deformation of the same that is produced, at least until a comparatively high rotational speed of the drive motor, no frictional contact exists between the surrounded spring windings and those extensions.

The one holder of a support shoe on a spring winding ensured region can advantageously be formed in one piece with the support shoe. For example, the support shoes can be produced from plastic, for example by injection molding. It can nevertheless also be advantageous when the one retainer of the support shoe on an ensuring region of the coil is at least partially formed by a separate component that has a connection with the basis body of the support shoe. That connection can be formed, for example, as a clip or snap connection. Nevertheless, the holder ensuring component can also be injected in the basic material of the support shoe which can be especially realized in a simple way by utilizing plastic. The connection or the holder region formed component can have at least a U-shaped cross section that forms two side legs that are received between the corresponding spring windings. The above-described separate component can be produced of spring steel or of a plastic material having suitable characteristics.

In an advantageous way, the support shoe—viewed in the circumferential direction of the spring windings—can have a cross section that has a curved or U-shaped course. It can thereby be appropriate when the support shoe is arranged in such a way that the spring windings of the coil spring surround it over an angle of at least 90 degrees. It can also be suitable for the support shoe to have an angular recess of at least 180 degrees. In an advantageous way, the support shoe can also be formed in such a way that it bounds an inner surface that extends over more than 180 degrees about at least one spring winding through which an operative form locking connection is produced that is perpendicular to the longitudinal axis of the coil spring. By such an arrangement of a support shoe it therefore encompasses the coil spring in such a way that a form-locking connection is provided between the support shoe and the coil spring.

The inventive arrangement can have particular application in connection with compression coil springs, which have a large length to winding outer diameter ratio. That can lie in the order of magnitude of from 5 to 20. With springs of that type several support shoes or support elements can be provided on them in an advantageous way. The distribution of those support elements over the length of a spring can particularly take place in such a way that upon blockage of at least sections of windings the support elements are not in contact with each other. The support elements provided at the end sections of such a spring are staggered in an advantageous way so that single spring windings are freely deformable, without which friction produced through a support element opposes the deformation.

BRIEF DESCRIPTION OF THE DRAWINGS

Further advantages, construction features, and functional characteristics of torsional vibration dampers formed in accordance with the invention appear in the following description, in which by reference numerals on the drawings different embodiments are described.

There is shown.

DESCRIPTION OF THE PREFERRED EMBODIMENTS

Figure 1:
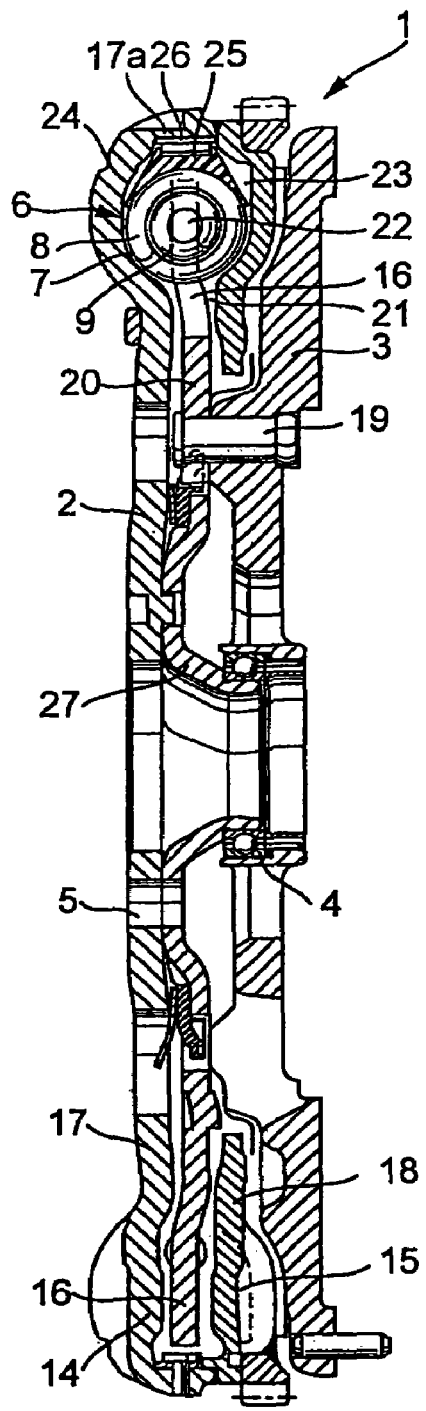
FIG. 1 a section through a damper unit by which the inventive solutions can be established, FIG. 2 the arrangement of a coil spring that can be utilized in a damper unit in accordance with FIG. 1, FIGS. 3 to 5 a configuration possibility of a support element that can be utilized in connection with an arrangement in accordance with FIGS. 1 and 2, FIGS. 6 and 7 a further configuration possibility of a support element for a coil spring, FIG. 8 an additional embodiment of a support element, FIGS. 9, 10 and 11, 12, 13 and 14 or 15, 16, 17 and 18 further arrangement and construction possibilities of different support elements and FIGS. 19 to 21 further advantageous details for the function of slide elements.
Figure 2:
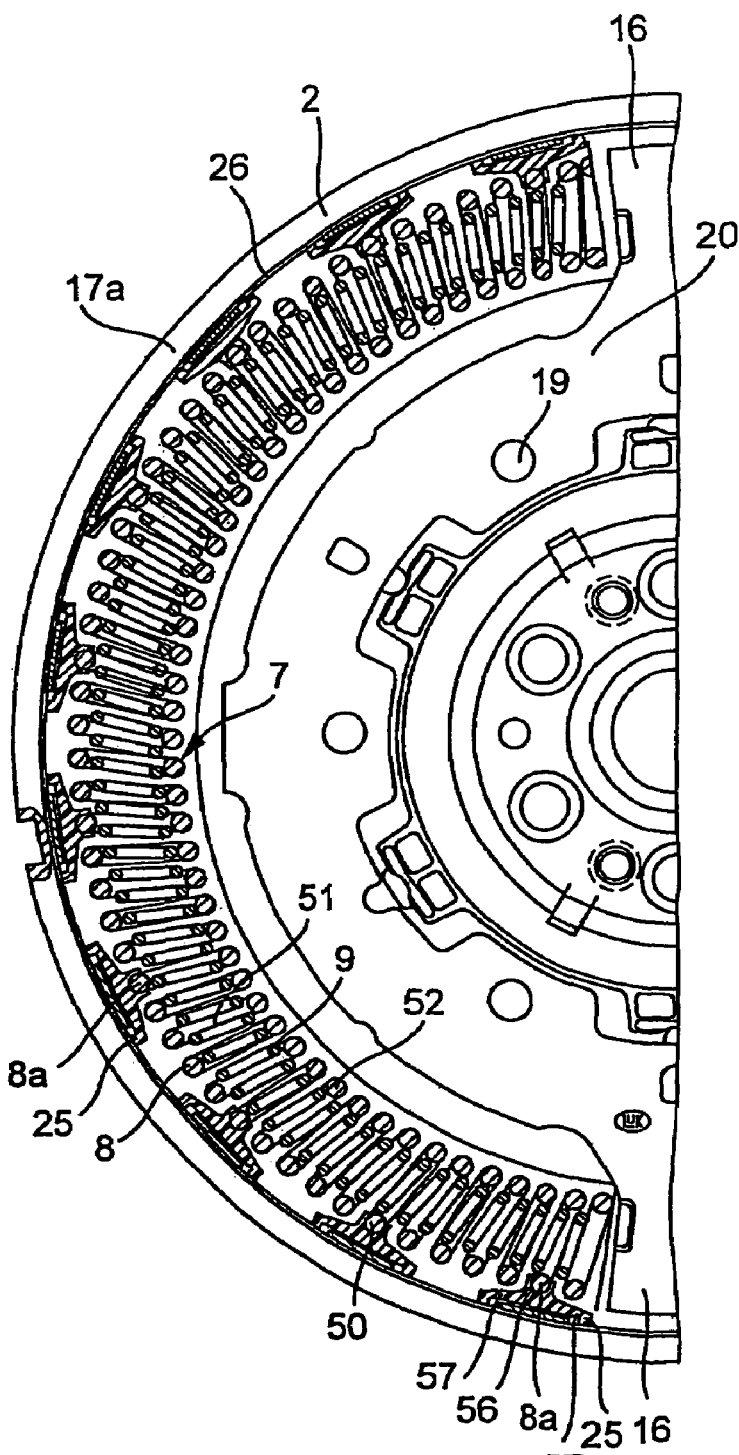

The torsional vibration damper 1 that is shown in section in FIGS. 1 and 2 is formed as a divided flywheel that has a first or primary flywheel part or inertial mass 2 attachable to a not shown output shaft of an internal combustion engine, as well as a second or secondary flywheel part or inertial mass 3. A friction clutch is attachable to the second inertial mass 3 through an intermediate clutch disc, through which an also not shown input shaft of transmission is coupleable and uncoupleable. The inertial masses 2 and 3 are rotatable relative to each other by way of a bearing 4 that, in the illustrated embodiment has bores 5 arranged radially outwardly for the passage of securing screws for mounting the first inertial mass 2 on the output shaft of an internal combustion engine. A damper unit 6, that includes energy storage device 7, of which at least one of which is formed of compression coil springs 8, 9, is operative between both inertial masses 2 and 3. Compression coil spring 9 is at least partially received in the space that is formed by the winding of spring 8, or, in other words, both compression coil springs 8 and 9 are viewed over their longitudinal extent as nested together. It can be appropriate if the spring 9—viewed in the circumferential direction of the torsional vibration damper—is shorter relative to the outer spring 8, for example, of the order of from 10 to 60 angular degrees, preferably in the region of 10 to 40 angular degrees. The length difference or the angular difference can, however, also be larger or smaller.

Both inertial masses 2 and 3 have contact regions 14, 15, and, respectively, 16 for the energy storage devices 7. In the illustrated embodiment, the contact regions 14, 15 are formed by stamped embossments on plate portions 17, 18 that form part of the first inertial mass 2. The contact regions 16 that are provided axially between the contact regions 14, 15 are formed by at least one flange-like component 20 that is connected to the secondary inertial mass 3, for example by rivets 19. The component 20 serves as a torque transmitting element between the energy storage devices 7 and the inertial mass 3. The contact regions 16 are formed by radial arms or extensions 16 that are provided at the outer periphery of the flange-like contact means 20. The component 17, produced by cold forming sheet material, serves to secure the first inertial mass 2 or the entire divided flywheel 1 on the output shaft of an internal combustion engine. Radially outwardly the component 17 is connected with the component 18 that likewise is also made from sheet metal. Both components 17 and 18 form an annular chamber 21 that here forms a torus-like region 22. The annular chamber 21 or the torus-like region 22 can be at least partially filled with a viscous medium, such as, for example, grease. Viewed in the circumferential direction between the formations or contact regions 14, 15, the components 17, 18 form seats or bulges 23, 24 that border the torus-like region 22 and form seats for the energy storage devices 7. At least during rotation of system 1, the springs 8 are supported by the radially outwardly bounded regions 17a of the component 17 and/or 18 of the rim-like or torus-like region 22. The support of coil spring 8 takes place through the intermediary of support elements 25 that radially outwardly can be moved along the regions 17a in the circumferential direction of the torsional vibration damper and radially inwardly support at least one winding 8a of the spring 8. In the illustrated embodiment there is provided at least one wear protector 26 that is formed by a hardened intermediate plate or plate insert, against which at least the support elements 25 are radially supported. The wear protector 26 extends in the circumferential direction in an advantageous way at least along the entire length or angular extent of the untensioned energy storage devices 7. As a result of the centrifugal support of the energy storage devices 7, insofar as there is provided a frictional engagement between the support elements 25 and the regions 17a that overlie the energy storage devices or the wear protector 26, a rotational-speed-dependent frictional damping is produced by the length change or compression of the energy storage devices 7, or the coil springs 8, 9.

The radially extending component 17 radially inwardly carries an intermediate part or hub 27, that respectively receives or carries the inner race of ball bearing 4. The outer race of ball bearing 4 carries the inertial mass 3.

On the basis of the above, possible friction can develop between the individual support elements 25 and the wear protector 26, especially at high engine rotational speeds and small, or insufficient, slackening of the energy storage device 7, whereby the damping characteristics of the torsional vibration damper can be reduced. Especially upon the occurrence of changes (acceleration/deceleration) by the operation of a motor vehicle, disturbing noises can thereby result, namely because the energy storer 7 then acts as a comparatively hard stop because the spring windings of the energy storer 7 remain in an at least partially tensioned condition as a result of the above-mentioned friction and thereby produce a high spring rigidity.

In order to avoid that, or at least to ensure a substantially greater relaxation of the energy storer, or at least of the coil spring 8 also at higher engine rotational speeds, special support elements 25 come into operation, that are fixed at least to a radially outer section 50 of a winding 8a of the coil spring 8. Through the centrifugal force exerted on the energy storage device 7 by the rotation of the torsional vibration damper 1, the supporting elements 25 are pressed outwardly and supported by the at least radially outer encircling wall regions 17a of the energy storage device 7. In the illustrated embodiment, the support elements 25 directly bear against the wall regions 17a or the wear protector 26.

The support elements that are shown in FIGS. 1 and 2 are shown in an enlarged scale in FIGS. 3 to 5. As can be gathered from FIGS. 3 to 5, a support element 25 is composed of a support shoe 27 and a roller body arrangement 28, that is arranged radially between the support shoe 27 and the wear protector 26. The roller body arrangement 28 is here composed of a plurality of needle rollers 29 (for example according to DIN 5402) arranged one after the other, as seen in the circumferential direction of the divided flywheel 1, that are positioned relative to each other and held against loss by a cage 30. The roller body arrangement 28 therefore forms a linear guide for the support shoe 27. As can be gathered from FIG. 4, a connection by means of snap connectors 31 is present between the cage 30 and the associated support shoe 27, which permits a circumferential displacement of roller body arrangement 28 and the cage 30, however ensuring retention between the roller body arrangement 28 and the support shoe 27 in the radial direction of the torsional vibration damper 1.

As can be gathered from FIG. 3, which shows the roller body arrangement 28 in a middle position relative to the support shoe 27, the roller body arrangement 28 is received in a recess 32 of the support shoe 27, in fact with rotational play 33, 34. Accordingly, the rolling bodies 29 can roll along the rolling surface 35 of the support shoe 27, so that by that play no friction is produced by the support element 25 during compression and relaxation of an energy storage device 7.

In the exemplary embodiment, the rolling surface 35 is formed by a metallic insert 36 that is provided in the base of the recess or depression 32 for the rolling element arrangement 28.

As can be seen in connection with FIGS. 3 and 5, a support shoe 27 has boundary means that limits the movement of the roller body arrangement 28 relative to the corresponding support shoe 27. In the illustrated exemplary embodiment, those boundary means are formed by end stops 37, 38, that define the recess 32.

As can be gathered from FIG. 5, unconfined movement of the rolling bodies 29 is no longer possible by continued relative rotation between the wear protector 26 and the support element 25. That means that by forcibly continuing a corresponding relative rotation the rolling body arrangement 28 is pushed along the wear protector against the end stop 37 so that friction results between the roller bodies 29 and the corresponding surface 26a of the wear protector 26, that is controlled in parallel with the elasticity of the corresponding energy storage device 7.

It is advisable to dimension the illustrated rotational clearances 33, 34 shown in FIG. 3 in such a way that they permit a relative rotation of at least two angular degrees between the input and output part of the torsional vibration damper 1, that is, here between the primary inertial mass 2 and the secondary inertial mass 3. However, preferably that possible rotational angle is designed to be as large as possible. Preferably, clearance is provided between the roller body arrangement 28 of roller bodies 29 and the support shoe 27 that corresponds with a rotation angle of at least 2° between the two inertial masses 2 and 3.

Through the inventive arrangement, a supporting element 25 it can thereby be ensured that, at least over the provided movement clearance 33+34 between the roller body arrangement 28 and the support shoe 27, the supported windings of an energy storage device, or at least one coil spring, can freely operate. Thereby it is ensured also at high rotational speeds of the torsional vibration damper a least a partial, free compression and relaxation of the energy storage device or the at least one coil spring. In the exemplary embodiment illustrated in FIG. 2 all support elements 25 are provided with a roller body arrangement 28 in accordance with the invention. However, it can be advisable to provide such a support element 25 only in the adjacent regions of the energy storage device 7 or coil spring 8 at the circumferential ends of the energy storage device 7 or coil spring 8, so that also at higher rotational speeds at least the end regions of the corresponding energy storage devices can be freely relaxed over a specified angle or over a specified distance. Particularly in the middle region of an energy storage device 7 support elements 125 can be utilized, as can be gathered from FIG. 8. The support element 125 illustrated in FIG. 8 does not have a roller body arrangement but only has a support shoe 127 formed as a slide shoe that has a suitable frictional engagement with the associated support surface 126a. In an advantageous way such shoes 125 can be combined with support elements 25 in accordance with the invention. The circumferential arrangement or sequence of such support elements 25, 125 can be made corresponding with the necessary or the desired damping effect. For many applications it can however be suitable to provide at least one support element 25 in accordance with the invention on at least one end region of a long energy storage device FIGS. 6 and 7 illustrate a further possible configuration of a support element 225. Support element 225 differs relative to a support element 25 in accordance with FIGS. 3 to 5 essentially in that it has an additional intermediate element 240 that is arranged radially outwardly of the roller body arrangement 228. The intermediate element 240 is, in turn, supported by a wall along which it is slidable. That wall can, in turn, be formed by a band-shaped wear protector 26 that was more specifically described in relation to FIGS. 1 to 5, for example. The intermediate element 240 forms a rolling surface 241 for the roller bodies 229 of the roller body arrangement 228. In the illustrated exemplary embodiment, the rolling surface 241 is formed by a metallic insert 242 that is embedded in the base material of the intermediate element 240.

As can be gathered from FIGS. 6 and 7, the utilization of an intermediate element 240 enables doubling the possible movement path or the possible rotation angle between the support shoe 227 that directly radially supports at least one spring winding and the radially outer support regions of the support element 228, such as, for example, as already explained, by a wear protector 26. It can be gathered, for example, from FIG. 6, that the rotation clearance 243, 244 of that shoe that is provided at both sides of a support shoe 227 relative to the intermediate element 240 is twice as large as the possible rotation clearance 233, 244 between the roller body arrangement 228 and the corresponding support shoe 227.

As can be gathered from FIG. 7, the regions 238, 239 of a support shoe 227 serve as stops that cooperate with opposed stops 245, 246 provided on the intermediate element 240 to limit the relative movement between a support shoe 227 and the associated intermediate element 240.

In an advantageous way, the displacement resistance of an intermediate element 240 as described in connection with FIG. 1 it can be reduced by an at least partial filling of the annular chamber 21 with a lubricant, for example, grease.

Furthermore, it can be especially advantageous when, in order to improve the structure of a lubrication film, at least one of the surfaces that are in frictional contact with each other has at least a smooth surface structure that favors the retention of a lubricant, such as grease, between the intermediate elements 240 and the supporting surfaces. The latter can be achieved, for example, by providing a certain unevenness or roughness on at least at one of the cooperating slide or support surfaces 26*a*, 247. In an advantageous way, at least one of the cooperating slide or support surfaces 26*a*, 247 can have a coating, such as is the case, for example, in sliding bearings. Such slide surfaces can contain, for example, PTFE, graphite or copper.

In an advantageous way, the intermediate elements 240 can be composed of plastic, whereby they can be produced in a simple way, namely by injection molding.

The support elements, especially in the form of slide shoes, can also be produced from a different material, for example those regions of a support element that engage the energy storage devices or the coil springs can be made of polyethylene-etherketone (PEEK) or fiber-reinforced polyamide (PA) 4.6. The support elements or slide shoes can also have an insert, for example metal reinforcement. One such metallic insert can be produced as a sheet metal formed part or as an injection molded part. As already mentioned, those regions that form slide surfaces of a support element can be composed of a low wear material. For example, non-reinforced PA 4.6TF30 can be utilized. Several plastics can also contain a slide-layer-forming material, for example, lead, tin and/or copper. On such composition can contain, for example, 9 to 11% lead, 9 to 11% tin, wherein the remaining portion can be composed of copper. If necessary, the slide layer can additionally be provided with an inlet layer that has a thickness in the order of magnitude of, for example, from 0.01 mm to 0.03 mm. One such inlet layer can be composed of PTFE and/or lead or a combination of different materials. It can be advantageous when the inlet slide is composed of about 20% lead and 80% PTFE, namely by volume. The above-mentioned portions for making a slide layer are given in percent by weight. It is advisable for the slide layer to amount to at least 0.1 mm, whereby is can be advisable when it has between 0.2 mm and 0.4 mm.

Those regions of a slide shoe that form a slide layer can be produced in one piece with the base body of the slide shoe, or else they can be sprayed on, clipped on, or bonded.

In addition to or alternative to the described slide layer, a slide layer can be provided in the regions 217*a* (see FIG. 9) that surround an energy storage device. The slide layer can be provided directly on the regions 217*a*, or else it can be part of a wear protector 26 described in connection with FIGS. 1 and 2. The fundamental substance of such a wear protector can be composed of a sheet metal strip or a shaped sheet metal part on which the slide layer is applied.

As also can be seen particularly in connection with FIG. 3, the support shoes 27 have regions 48, 49 that project radially inwardly and are here formed by nose- or hook-shaped regions 48, 49. Noses 48, 49 each encompass the radially outer section 50 of a coil spring winding 8*a*. The form lock thereby formed between the support shoes 27 and the associated windings 8*a* ensure at least a positioning or securing of the support shoes 27 or the support elements 25 in the longitudinal direction of the spring 8.

Furthermore, through the special formation of the regions or noses 48, 49, which are especially apparent from FIG. 3, a preferred force-locking connection between the support shoes 27 and the associated spring windings 8*a* is also ensured in the radial direction. The thereby formed holding of the support shoes 27 on the associated windings 8*a* in a direction perpendicular to the longitudinal axis 51 (FIG. 2) of the energy storage device 7 (FIG. 2), makes possible in an advantageous way a preassembly of the support elements 25 on the corresponding spring 8. Thereby the assembly of a torsional vibration damper 1 is substantially simplified. In an advantageous way the coil spring 8 provided with support elements 25 are arranged in curved form, whereby their assembly is simplified.

The energy storage devices 7 that are assembled in connection with the support elements 25 are, as already mentioned, preferably of elongated form, and therefore have a large ratio of spring length/outer diameter which can be of the order of magnitude between 5 and 20.

The configuration and arrangement of the energy storage devices 7 preferably results in such a way that they limit the relative rotation between the input part and the output part of the torsional vibration damper 1, which is here formed of both inertial masses 2, 3. For that purpose, the coil springs 8 are preferably here loaded as a block in that the radially inner lying winding sections 52 form a block so that they are in direct contact with each other. By the curved arrangement of a spring 8 it is furthermore ensured that in the region of the radially outer sections 50 of the spring windings of a coil spring 8 sufficient free space is provided in the circumferential direction to minimize crushing or damage to the holding regions 48, 49 of the support shoes 27. The latter can be realized by a suitable selection of the spring wire that forms a spring 8, the coil diameter, the inclination of at least individual windings and the radius of curvature provided to the spring. It can also be suitable when the windings 8*a* received on a support shoe 27 have another form than the windings provided between the windings 8*a*. Thus, for example, those windings 8*a* can extend radially outwardly relative to the adjacent windings, which can be achieved by an oval-like arrangement of windings 8*a*. The corresponding windings 8*a* can also have a larger outer diameter than the adjacent windings.

The regions 48, 49 are shaped in such a way that they form sections 53, 54 (FIG. 50) that engage the back of winding 8*a*. The regions 48, 49 are arranged in such a way that they have a certain elasticity or resiliency so that the support shoes 27 can be clipped onto associated winding 8*a*. In accordance with the invention, a snap connection can be provided between a support shoe 27 and the associated winding 8*a*, which ensures a loss-secure mounting of the shoes 27 to the associated spring 8.

The region that cooperates with spring winding 8*a*, that also includes the safety regions 48, 49, is preferably designed in such a way that the winding 8*a* has a certain angular degree of freedom relative to the support shoe 27, so that the winding 8*a* can be deformed when the spring is compressed and relaxed, without which a pivoting or rotation force would thereby be exerted on the support shoe 27. Thereby it is ensured that the support element 25 is constantly maintained in its optimal alignment and thereby functions acceptably. The pivot angle necessary therefor is mainly dependent upon the inclination angle of the spring windings. It can be appropriate when the possible pivot angle between a support shoe 27 and a spring winding 8*a* is in the order of 2 to 10°. However, it can also be suitable for that angle to be larger.

The regions of a support shoe 27 that encompasses a winding 8a are preferably designed in such a way that they encompass the wire 55 (FIG. 3) that forms the winding 8a both relative to its cross section and well as over its longitudinal extent.

As is particularly apparent from FIGS. 1 to 5, a support shoe 27 has on both sides of region 56 (FIG. 5) that receives or supports a spring winding 8a, an extension or shoulder 57 that extends in a longitudinal direction of spring 8, and that as can be concluded from FIG. 1 encompasses the spring windings in an advantageous way over a predetermined angle. The extensions 57 in the illustrated exemplary embodiment in cross section are formed in such a way that they diminish with increasing distance from the region 56. In the illustrated exemplary embodiment the extensions of shoulders 57 are wedge-shaped in cross section. Through the special arrangement of extensions or shoulders 57 it is ensured that also at high rotational speeds the windings adjacent to the regions 48, 49 do not rest on the support shoes 27, so that friction of those windings on the support shoes can practically be avoided during compression and relaxation of springs 8. The support elements 25 are formed and arranged over the length of a spring 8 in such a way that they make possible a blocking force without contact in the circumferential direction. The spacing between two support elements 25 that follow each other is preferably dimensioned in such a way that the existing sections of a spring 8 between two elements 25 that follow each other are sufficiently stiff in the radial direction to prevent contact of the spring windings on the support guide surface 26a, at least within a large rotational speed region of the engine. At higher rotational speeds (for example greater than 4000 U/min.) such contact can however possibly take place, whereby the thus occurring support forces between the corresponding windings of a spring 8 and the guide surface 26a are reduced.

Figure 9:
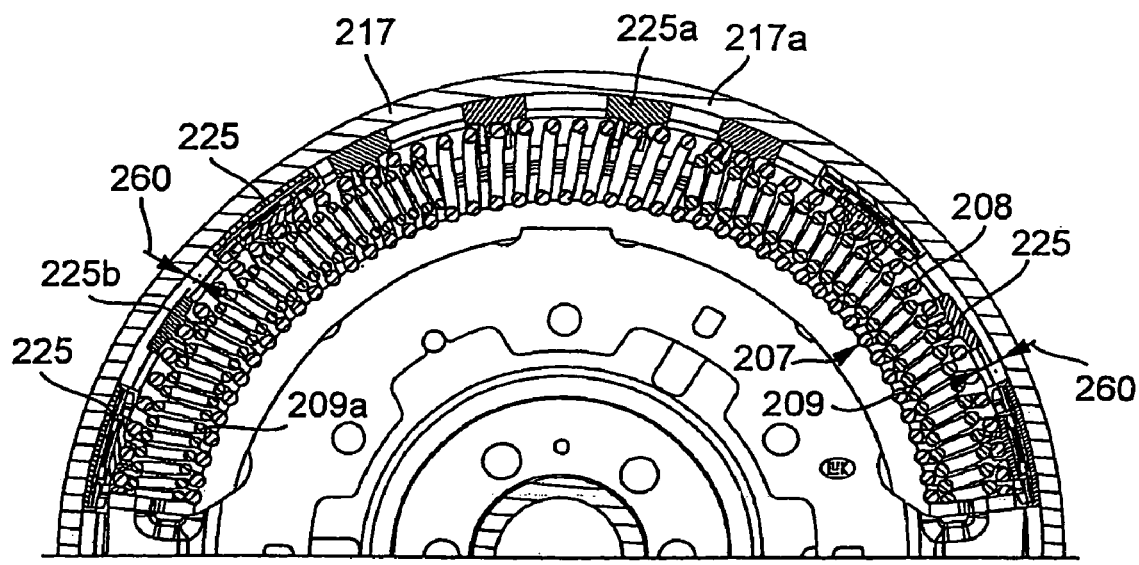

By the only partially illustrated torsional vibration damper in FIG. 9 a component 217 of the torsional vibration damper radially supports the energy storage device 207 composed of a plurality of compression coil springs 208, 209, 209a, on a region that overlaps in both an axial as well as in a circumferential direction through a plurality of differently formed support elements 225, 225a and 225b, at least under centrifugal action.

The support elements 225 that are provided at the end regions of the energy storage device 207 are composed of a roller body arrangement, by means of which they are supported on the inner surface of the region 217a, either directly or indirectly. The support elements 225 can be similarly formed, as described in connection with FIGS. 1 to 5 or FIGS. 6 and 7. Basically, however, other roller body arrangements are also possible, which will be described below.

The support elements 225a that are provided in the middle region of the energy storage device 207 are formed as slide shoes in the illustrated exemplary embodiment and can therefore have a similar functionality as those described in connection with the slide shoe in accordance with FIG. 8.

In the illustrated exemplary embodiment of FIG. 9 a further support element 225 is provided at a certain distance from the support elements 225 at the end regions of the energy storage device 207, which likewise has a roller body arrangement. It can thereby be ensured that a longer length of the energy storage device 207 can be compresses and relaxed practically without frictional hysteresis.

It is further understandable from FIG. 9 that a support element 225b is provided between the two support elements 225 that follow on behind the other at respective end regions of the energy storage device 207, that has a radial spacing 260 relative to the inner support surface of the region 217a, at least when the torsional vibration damper is not rotating. In a suitable way, the support elements 225b have a radial connection with at least one winding so that it is also not disengaged from the spring 208 under the action of centrifugal force.

The distance between the two support elements 225 with roller body arrangements and that follow one another is dimensioned in an advantageous way such that the regions of the energy storage device 207 provided therebetween is sufficiently rigid in the radial direction to prevent the support of the corresponding spring regions of a contact between the corresponding support elements 225b on the inner wall of the region 217a, at least over a large rotational speed range of the engine. At higher rotational speeds such support or contact can nevertheless take place whereby on the basis of the support element 225b that functions as a slide shoe both the deflection of the corresponding regions of the energy storage device 207 as well as the friction that acts is limited. The roll shoes formed by the support elements 225 and the at least one slide shoe 225b arranged between two such roll shoes therefore make possible the realization of larger free resilient partial lengthening of an energy storage device 207.

In the illustrated exemplary embodiment the above-described arrangement of roll shoes 255 and slide shoes 225b is provided at both ends of the energy storage device 207. One such arrangement can nevertheless also be provided only at an end or else over the entire length. It is advantageous if the above-described combination of roll shoes 225 and slide shoes 225b are provided at least at the end region of an energy storage device 207, which during acceleration of the motor vehicle equipped with a corresponding torsional vibration damper is mainly loaded or compressed.

The use of support elements in accordance with the invention, such as, for example, slide shoes or rolling shoes, that serve to radially support a region of an energy storage device acted upon by centrifugal force, and that ensure a support function for an energy storage device at higher rotational speeds, and take place in combination with any regularly operating support elements, for example, 225 and/or 225a. That principle can therefore also be utilized in a supporting guide for energy storage devices, which have only slide shoes. In the embodiment illustrated in FIG. 9, only a corresponding arrangement of slide shoes 225a and 225b can therefore be utilized.

For many applications it can also be appropriate, at least when the torsional vibration damper is not rotating, for the support elements to be loosely engaged, having radial play between the adjacent support elements such as, for example, 225 in accordance with FIG. 9, and thus have no longitudinally effective connection with the energy storage device. In such an arrangement the support elements, such as, for example, slide shoe 225b, can be supported under the effect of centrifugal force on the inner surface of the surrounding region 217a and regions of spring 208 of the energy storage device 207, first come to rest on those support elements, such as, for example, slide shoes 225b at higher rotational speeds.

As already mentioned, the energy storage device 207 shown as an exemplary embodiment in FIG. 9 is composed of three coil springs 208, 209, 209a. In such an arrangement of the energy storage device an at least two-stage characteristic curve can be achieved. By utilizing inner coil springs 209, 209a having different spring stiffnesses, an at least three-stage characteristic curve can also be achieved, because when one of both springs 209, 209a with weaker spring characteristic becomes blocked the inner spring having a stronger spring characteristic still has residual spring travel. As is further apparent from FIG. 9, between the associated end regions of inner springs 209, 209a, at least in relaxed condition of the energy storage device 207 a circumferential spacing is provided. If needed, that spacing can be at least partially filled by a further inner spring, so that then still further variation possibilities are realizable relative to the overall characteristic curve of the energy storage device 207.

By utilizing inner springs 209, 209a with different spring characteristics, it is appropriate to provide the spring with the lower stiffness at the end or in the end region of the energy storage device 207 that is mainly stressed during pulling operation of a motor vehicle equipped with a corresponding torsional vibration damper. The weaker inner spring should therefore be provided at the end region of the energy storage device 207 which surrounds the end of energy storage device 207, through which the torque produced by the drive engine during pulling operation is introduced into the energy storage device 207. During slowing operation the torque is introduced at the other end of the energy storage device 207. Slowing operation of a motor vehicle is then provided when the vehicle is retarded by the braking operation of the engine, thus when a torque flow is produced by the drive wheels to the engine.

The limit of spring travel of an energy storage device 207 can take place by contact of at least the radially inner winding regions of the outer spring 208, or else by the inner springs 209, 209a that are connected in series.

It can be advisable when the parallel-connected outer spring 208 and the inner spring with lower stiffness, for example, 209a, has a resulting spring rate of the order of magnitude of between 5 and 13 Nm/°. The rotational stiffness of the outer coil spring 208 and that of the spring operating parallel thereto with higher stiffness, for example, 209 can be of the order of magnitude of between 12 and 23 Nm/°.

Figure 10:
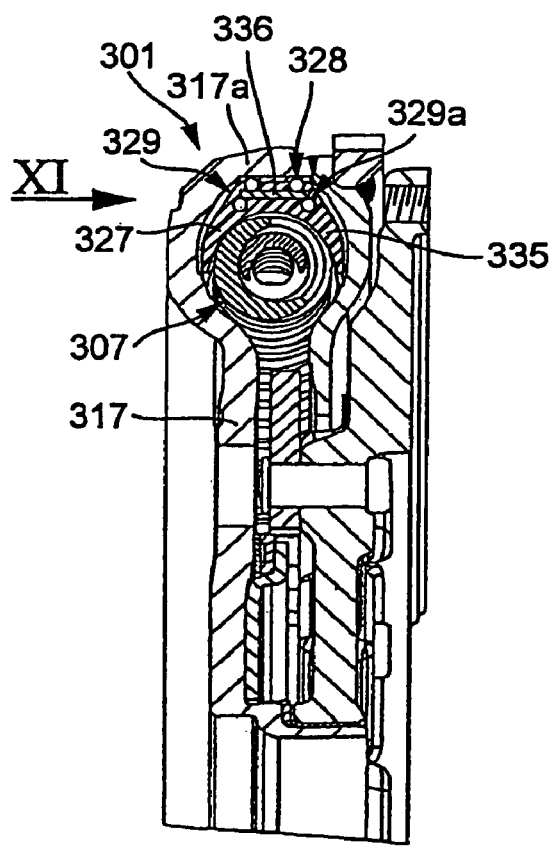
Figure 11:
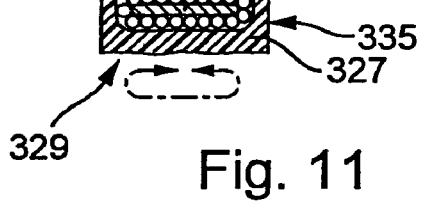

In the exemplary embodiment illustrated in FIGS. 10 and 11, at least some of the energy storage devices 307, which can be partially formed by coil springs, include centrifugally supported elements 335 formed by roller shoes. The roller shoes 335 have a base 327 on which the energy storage device is radially supported, as well as a roller body arrangement 328, which ensures the radial support between the base 335 and a radially outer track that in the present case is formed by a wear protector 326. The wear protector 326 is arranged similar to that described in connection with the wear protector 26 in accordance with FIGS. 1 and 2. In case the wear protector 326 is not needed, it can also be eliminated so that then a roller shoe 335 can be supported directly on the axially surrounding regions 317a about an energy storage device 307 of a component 317 of the torsional vibration damper 301 that is formed as a two-mass flywheel.

As can be gathered from FIGS. 10 and 11, the roller body arrangement 328 has two roller body rotation arrangements that have balls 330 in the illustrated embodiment. The balls 330 are received and guided in the base 327 for which corresponding channels are provided in respective bases 335 for the rotational transport or the continuous transport of the roller bodies 330. In the illustrated exemplary embodiment an intermediate wall 336 is provided that is preferably formed from a metallic insert. The intermediate wall 336 is supported radially by the base 327 of a roller shoe 325.

As can be gathered from FIGS. 10 and 11, the balls 330 are found radially outward of the intermediate wall 336 and are supported radially inwardly by intermediate wall 336 and radially outwardly by the rolling surface on the wear protector 326, so that when a roller shoe 325 is moved relative to the wear protector 326 the corresponding balls 330 execute a rolling movement and are guided along the channels that are radially below the intermediate wall 336, so that the balls 330 can pass along the circular paths formed by the corresponding channels. The roller body arrangements 329 and 329a therefore have a radial ball recirculation arrangement. It is further apparent from FIG. 10 that the recirculating ball arrangements 329, 329a are formed in such a way that the directly further inner balls 330 of both arrangements 329, 329a are spaced further from each other than the directly radially outer balls 330. As also apparent from FIG. 10, the roller body arrangements 329, 329a are therefore arranged V-like, whereby the imaginary apex is directed radially outwardly. The V-shaped arrangement can however also be designed inverted, so that then the imaginary apex points radially inwardly. For many applications it can also be suitable for the roller body recirculation arrangements 329, 329a to be arranged in such a way that the radially outwardly positioned balls and the radially further inner balls are practically directly radially arranged one above the other. The radially outwardly situated balls 330 on the intermediate wall 336 can be supported in a conventional way, such as by deep grooved ball bearings, or else the support contours for the balls 330 formed by the intermediate wall 336 can be designed in such a way that the balls are supported by the intermediate wall 336 similar to an angular contact ball bearing. The roller pathways of both roller body arrangements 329, 329a for the balls that are located further radially outwardly can thereby be provided similar to a two-row angular contact ball bearing.

Instead of balls 330 short needles or barrels can also be utilized as roller elements.

As already mentioned, the roller body arrangements 329, 329a are designed in such a way to provide a practically radially oriented roller body path. In the embodiment shown in FIG. 12 both roller body arrangements 429, 429a are designed in such a way to provide a practically axial roller body path.

Figure 12:
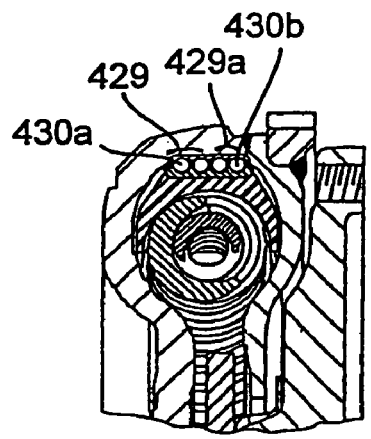

In the exemplary embodiment illustrated in FIG. 12 the centrifugal support results from the axially outer ball rows 430a, 430b. For many applications it can however also be suitable for both middle ball rows to serve as radial support and the axially further spaced ball races are found in a circumferential channel.

The utilization of support elements with circulating roller body arrangements has the advantage that such support elements are not limited relative to the permitted swing angle or rotation angle, and thereby, if necessary, such support elements can be installed distributed over the full length of a long energy storage device.

Figure 13:
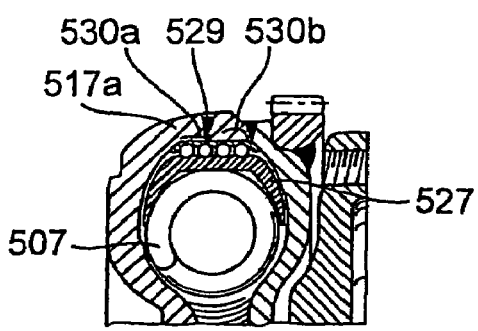

In the embodiment in accordance with FIG. 13 a roller body ring 529 is utilized that can extend along the circumference of regions 517a that support the energy storage devices 507. The roller body ring 529 has at least one, preferably two roller body circulation arrangements 530a, 530b that extend along the full circumference of the internal surfaces of the regions 517a. The support shoes 527 linked to the energy storage devices 507 can roll along those roller body arrangements 530a, 530b. The roller body arrangements 530a, 530b are therefore not connected with the support shoes 527, but with the roller body ring 529 that is arranged between the regions 517a and the shoes 527.

Figure 14:
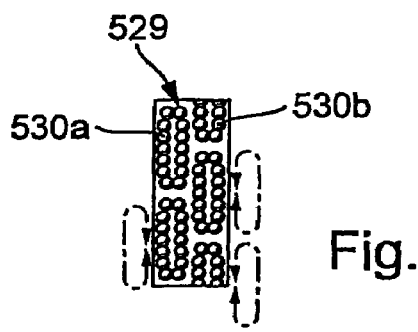
Figure 15:
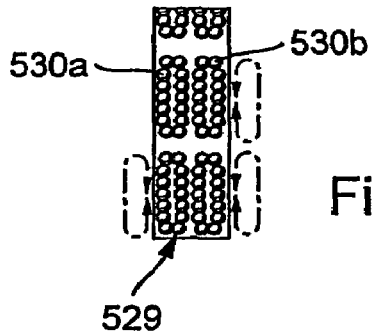

As can be gathered from FIGS. 14 and 15, a roller body ring 529 can also have a plurality of roller body arrangements 530a, 530b arranged over its length at smaller, angular extent. In the embodiment in accordance with FIG. 14, the individual roller body arrangements 530a, 530b are offset in the longitudinal direction, or circumferential direction of the ring 529, whereas in the embodiment in accordance with FIG. 15 no circumferential offset is provided between roller body arrangements 530*a*, 530*b* that are arranged in parallel with each other in the longitudinal direction of the ring 529.

Figure 16:
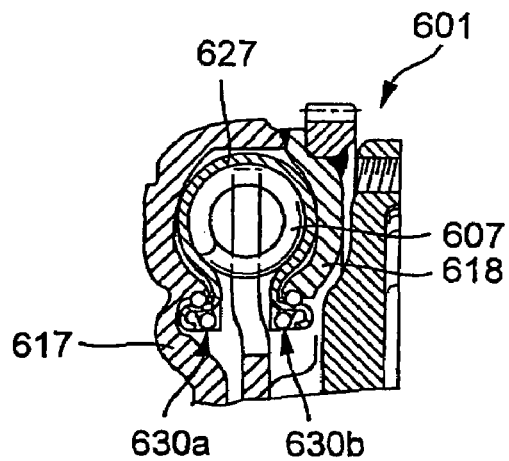

In the embodiment in accordance with FIG. 16, the support of an energy storage devices 607 is in places the result of retainer elements 627 that at least in places overlap or encompass the energy storage device 627 and are supported on components 617, 618 of a torsional vibration damper 601 formed as a two-mass flywheel by means of roller body circulation arrangements 630*a*, 630*b*.

The components 617, 618 in the illustrated exemplary embodiment are designed similar to the components 17, 18 described in connection with FIGS. 1 and 2.

The retaining elements 627 associated with an energy storage device or at least an elongated coil spring can be of shell-like form and, as shown, can be designed as sheet metal parts or else also of plastic or of a combination of several materials. The circumferential connection between the at least one coil spring and the associated retaining elements 627 can result as described in connection with FIGS. 1 to 7, that is, by means of a form-lock. For many applications, however, simply a frictional connection can be sufficient.

Figure 17:
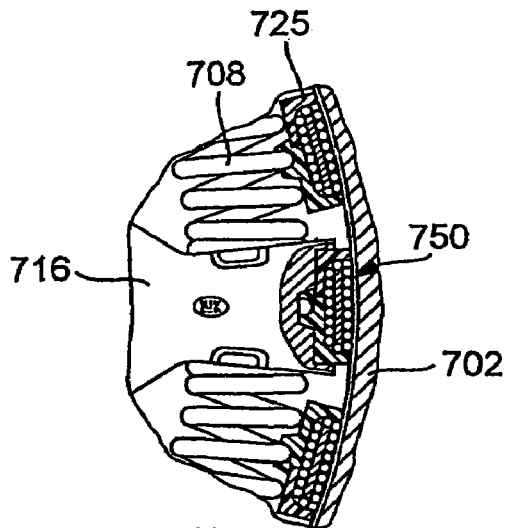

In the embodiment in accordance with FIG. 17, the flange 716, which can be concentrically securely connected by roller body circulation shoes 750 with the transmission side inertial mass, is centered relative to, for example, the inertial mass 702 provided on the engine side. By such a centering of the flange 716, which relative to its function is comparable to the flange 16 in accordance with FIGS. 1 and 2, the centering bearing 4 provided in FIGS. 1 and 2 can be eliminated.

As can be seen from FIG. 17, roller body circulation shoe 750 is formed similar to the roller body circulation shoes 725 that support the coil springs 708.

Figure 18:
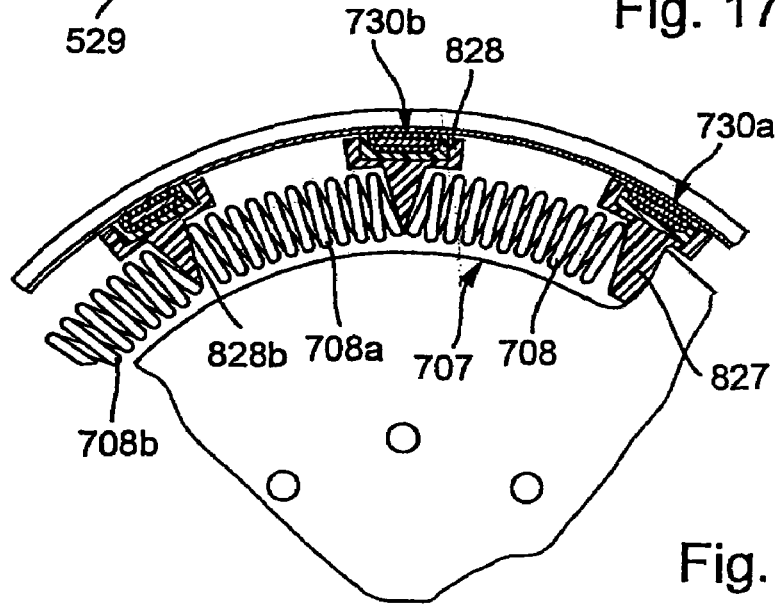

As can be seen from FIG. 18, the inventive configurations and arrangements of support elements 827, 828 can be utilized with at least one roller body circulation arrangement 730*a*, 730*b*, and in an especially advantageous way in connection with elongated energy storage devices 707 that are composed of short, individual energy storage devices 708, 708*a*, 708*b* connected in series. As shown, the individual shorter energy storage devices can be composed of a single coil spring, or else also of several coil springs that are nested within each other, whereby the nested coil springs can have equal or different lengths. As can be seen from FIG. 18, the roller body circulation shoes 828 are formed in such a way that they have a radially inwardly extending projection 828*b*, that here is wedge-shaped, that engages between the end windings of two adjacent, shorter energy storage devices. The roller body circulation shoes 828 have regions directed in the circumferential direction, which overlap the associated energy storage devices for radial support.

By one embodiment, at least in accordance with FIG. 16, the support elements 627, which namely are associated with different energy storage devices, can be non-rotatably connected to each other, however relative to the compression path they support the same regions of the different energy storage devices. For that purpose the individual support elements can be non-rotatably connected together, for example by an annular locked region.

Figure 19:
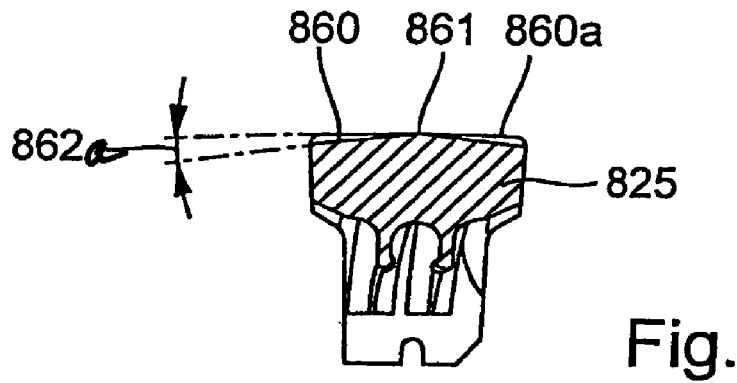
Figure 20:
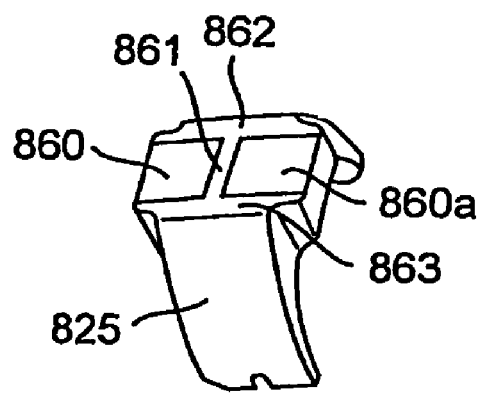

The slide shoe 825 shown in section in FIG. 19 and in a perspective view in FIG. 20, can be coupled with a coil spring or an energy storage device in a manner similar to the connection with the roller or slide shoes described in accordance with FIGS. 1 to 5.

It can be seen in FIGS. 19 and 20 that a slide shoe 825 has radially outer formations 860, 860*a* that here are formed as recesses or grooves that are open radially outwardly. As is apparent especially from FIG. 19, the formations 860, 860*a* are wedge-shaped, whereby those wedge-shaped grooves 860, 860*a* extend outwardly from the center of the slide shoe 825. Between the outlet regions of the groove-like formations 860, 860*a* the slide shoe 825 has a slide surface region 861.

As is apparent especially from FIG. 20, the wedge-shaped recess formations 860, 860*a* extend only partially over the entire width of a slide shoe 825, so that on both sides of the formations 860, 860*a* there remain guide sections 862, 863 directed in the circumferential direction. It is advisable to provide such guide sections 862 and/or 863 at least over partial regions of the width of a slide shoe 825 to prevent tipping of the slide shoe 825 or a pivoting relative to the region 861.

In the embodiment shown in FIG. 20 the width of the recessed formations 860, 860*a* is constant.

Figure 21:
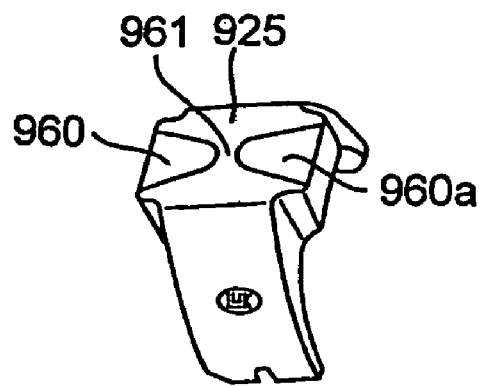

In the embodiment illustrated in FIG. 21, the formations 960, 960*a* are formed as a taper or wedge shape from the middle region 961 of the slide shoe 925 outward.

By an appropriate determination of the wedge angle 862*a* indicated in FIG. 19 as well as the width pattern of the formations 860, 860*a* or 960, 960*a*, the buildup of a hydrodynamic lubricant film between slide shoe 825 or 925 and their radially supported guide surfaces can be positively influenced. Thereby the friction or rotational resistance, especially by a displacement of a slide shoe 825 or 925 along its guide surface can be substantially reduced.

In the illustrated exemplary embodiments of the slide shoes 825, 925 starting from a circumferential end has only one formation 860, 960 or 860*a*, 960*a*. However, it can also be suitable when at least two such formations 860, 960 or 860*a*, 960*a* are provided over the width of a slide shoe 825, 925, that in each case have a correspondingly smaller width. By one such arrangement the formations starting from both end regions associated with a slide shoe 825 or 925 are aligned with each other, therefore provided in alignment relative to the sliding movement direction of a slide shoe 825. However, it can also be suitable when the formation 860 starting from one end in reference to the formation 860*a* starting from the other end, viewed over the width of a slide shoe 825, are arranged offset to each other.

The arrangements and operating modes in accordance with the invention can be utilized with particular advantage in conjunction with so-called twin-mass flywheels, which are known, for example, through DE-OS 4 117 582, DE-OS 4 214 655, DE-OS 4 414 584, DE-OS 4 420 927 and DE-OS 19522718. Basically, however, the invention can also be utilized in conjunction with each of any torsional vibration dampers that have coil springs, such as, for example, clutch discs or belt pulley dampers.

The arrangements and operating modes in accordance with the invention can also be installed in an advantageous way in lockup clutches with torsional vibration dampers for hydrodynamic torque converters. Such lockup clutches are known, for example, through the following patents U.S. Pat. Nos. 5,868,228, 5,769,195, 5,279,398 and 5,377,796.

In connection with the invention, energy storage devices that have al least one coil spring can be installed in an advantageous way as proposed, for example, in DE-OS 4 229 416, DE-OS 4 406 826, DE-OS 19603248, DE-OS 19648342, DE-OS 19909044 and DE-OS 19912970.

The patent claims submitted with the application are formulation proposals without prejudice for attaining more extensive patent protection. The applicant reserves the right to claim additional feature combinations previously disclosed only in the description and/or drawings.

References utilized in the dependent claims refer to the further development of the object of the main claim through the features of the respective dependent claim. They are not to be understood as a waiver of attaining an independent, objective protection for the feature combinations of the referred-to dependent claims.

Since the objects of the dependent claims could, with respect to the condition of the art on the priority day, form their own and independent inventions, the applicant reserves the right to make them the objects of independent claims or statements of division. They can furthermore also contain independent inventions, which have a configuration independent of the objects of the preceding dependent claims.

The exemplary embodiments are not to be understood as a restriction of the invention. Rather, numerous changes and modifications are possible in the framework of the present disclosure, especially such variants, elements and combinations and/or materials which can, for example, be deduced by the specialist with regard to the solution of the object by the combination or modification of individual features or elements or procedural steps in connection with the general description and embodiments as well as described in the claims or contained in the drawings, and which lead by combinable features to a new object or to new procedural steps or procedural step sequences, also to the extent that they concern manufacturing, testing and operating procedures.

What is claimed is:

1. A torsional vibration damper comprising:
a divided flywheel including a primary flywheel connectable with a drive shaft of an engine and a secondary flywheel connectable with an input shaft of a transmission through a friction clutch, wherein the primary and secondary flywheels are rotatably supported relative to each other by a bearing and are movable relative to each other about an axis of rotation in opposition to the operation of at least one energy storage device, whereby both flywheels have regions by means of which the energy storage device is disposed in a circumferential direction of the torsional vibration damper and is compressible, at least one of the relatively rotatable flywheels has a wall region that bounds an annular chamber and that axially overlaps at least radially outer regions of the energy storage device and extends along the energy storage device, wherein the energy storage device includes at least two circumferentially arranged energy storage components and is radially outwardly supported by at least one support element that is arranged between the energy storage device and the wall region and that is movable along the wall region upon compression of the energy storage device, whereby the support element has at least one support shoe engaging at least one region of the energy storage device, and at least one roller body is provided between the support shoe and the wall region for rolling movement along a surface carried by the support shoe and including an intermediate element provided between the wall region and the at least one roller body, wherein the intermediate element is movable along the wall region and forms a support surface for the at least one roller body.

2. A torsional vibration damper in accordance with claim 1, wherein the roller body can execute a rolling movement at least relative to sections of the said wall region.

3. A torsional vibration damper in accordance with claim 1, wherein the intermediate element has limited movability relative to the support shoe and during movement the at least one roller body is supported on a surface of the support shoe and on a surface of the intermediate element.

4. A torsional vibration damper in accordance with claim 1, wherein a plurality of roller bodies are provided arranged one after another in the circumferential direction of the torsional vibration damper.

5. A torsional vibration damper in accordance with claim 4, wherein the roller bodies are positioned one after another in a cage.

6. A torsional vibration damper in accordance with claim 1, wherein the roller bodies are formed as balls, rollers or needle rollers.

7. A torsional vibration damper in accordance with claim 1, wherein the at least one roller body can execute only a limited movement relative to the support shoe.

8. A torsional vibration damper in accordance with claim 1, wherein the intermediate element is slidable along the wall region.

9. A torsional vibration damper in accordance with claim 1, wherein at least one of the support shoe and the intermediate element is composed of plastic.

10. A torsional vibration damper in accordance with claim 9, wherein at least one of the support shoe and the intermediate element has a metallic insert that forms a roller path for the at least one roller body.

11. A torsional vibration damper in accordance with claim 1, wherein the torsional vibration damper has at least two energy storage devices that extend over at least 90° in the circumferential direction of the torsional vibration damper, and at least adjacent end regions of the energy storage devices are radially supported by the at least one support element.

12. A torsional vibration damper in accordance with claim 11, wherein regions of the energy storage devices that lie between the end regions are supported by the at least one support element.

13. A torsional vibration damper in accordance with claim 11, wherein at least the support elements provided in the end regions of an energy storage device include roller bodies.

14. A torsional vibration damper in accordance with claim 1, wherein the energy storage device is formed from at least one coil spring.

15. A torsional vibration damper in accordance with claim 14, wherein the at least one coil spring is guided in a curvilinearly extending retainer that is formed from regions of at least one of the flywheels that are rotatably movable relative to each other, whereby the retainer is bounded by the wall region, and the support shoe radially supports at least one winding of the spring.

16. A torsional vibration damper in accordance with claim 15, wherein the support shoe has at least one region that at least partially surrounds a radially outer section of a coil spring, whereby the support shoe is fixed relative to the coil spring in the longitudinal direction of the coil spring.

17. A torsional vibration damper in accordance with claim 15, wherein a connection is provided between the support shoe and the coil spring, which connection produces a holding of the support shoe relative to the coil spring in a direction perpendicular to the longitudinal axis of the coil spring.

18. A torsional vibration damper in accordance with claim 17, wherein the holding of the support shoe on the coil spring takes place through the region of the support shoe that at least partially surrounds one winding of the coil spring, whereby the region that at least partially surrounds a wire that forms the winding produces at least one of a force-locking and a form-locking connection with the winding.

19. A torsional vibration damper in accordance with claim 18, wherein the holding provided between the support shoe and the corresponding spring winding allows at least a small angular rotational movement of the winding relative to the support shoe.

20. A torsional vibration damper in accordance with claim 17, wherein the holding of the support shoe takes place on a spring winding by a snap-on connection.

21. A torsional vibration damper in accordance with claim 19, wherein the rotational movement lies in the order of magnitude of from 2° to 10°.

* * * * *